Patented June 19, 1934

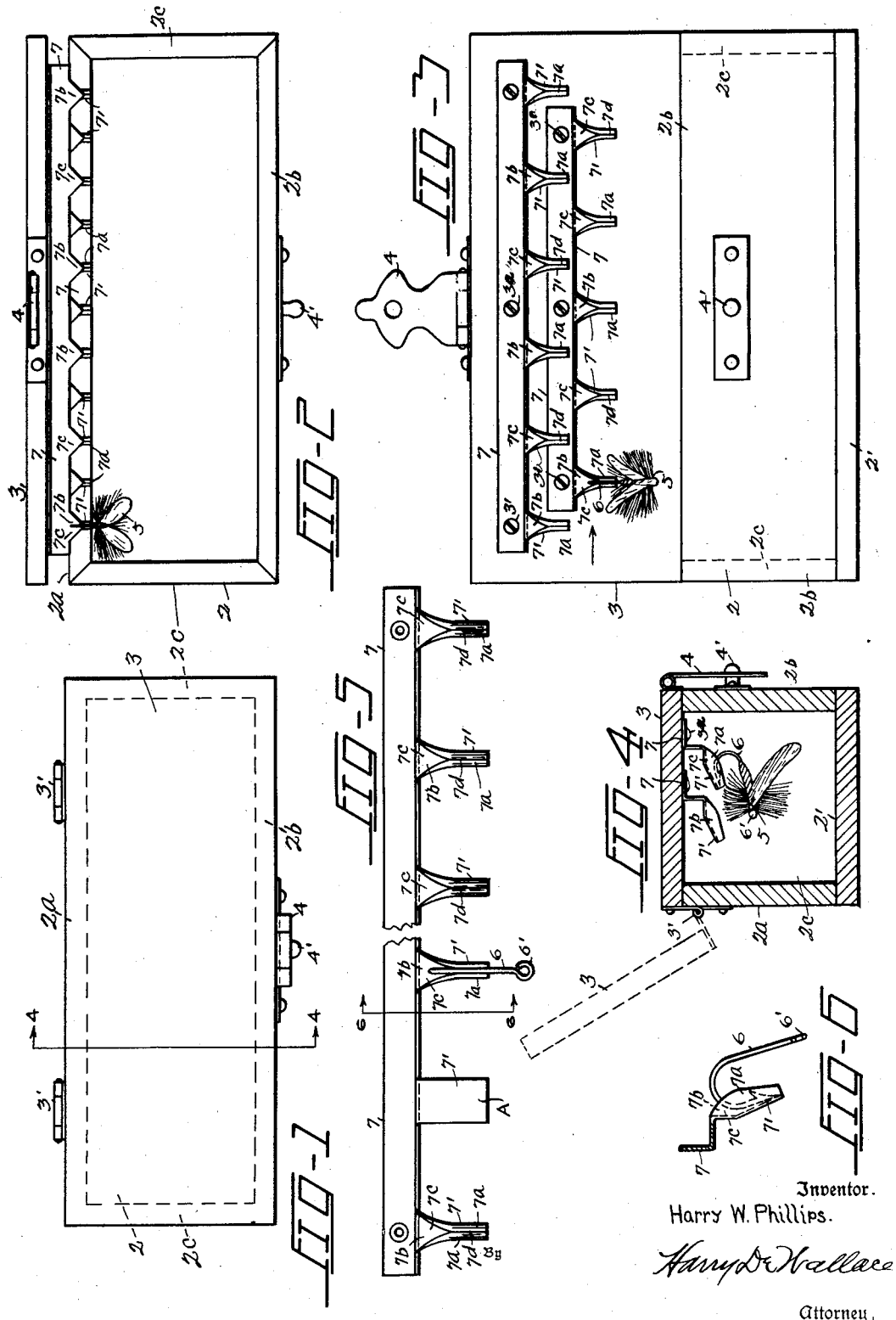

1,963,502

UNITED STATES PATENT OFFICE 1,963,502

FLY BOX

Harry W. Phillips, Jordan, N. Y.

Application May 8, 1933, Serial No. 669,845

3 Claims. (Cl. 43—32)

This invention relates to novel means for inclosing and supporting a variety of artificial fish bait, particularly of the fly type, and has for its object to provide an oblong box-like container having a hinged cover or lid, upon the inner face of which is detachably mounted a plurality of elongated metal strips formed along their corresponding longitudinal edges with a number of laterally projecting arms folded to provide similar Y-shaped grooves or troughs, which resiliently grip and hold the hooks of the several flies in a firm and orderly manner, and from which the various flies may be conveniently and selectively detached; the arms of said holding strips preferably being staggered so as to prevent contact and consequent distortion of the more or less delicate and fragile wing-structure of the flies, and the flies being so disposed upon the lid that when the latter is closed, the flies depend in the box proper free and clear of each other, as well as of the several walls of the box.

I attain these objects by the means set forth in the detailed description which follows, and as illustrated by the accompanying drawing, in which—

Figure 1 is a top plan view of the box with the lid closed. Fig. 2 is a top plan of the box and an edge view of the open lid. Fig. 3 is a front elevation of the box and a bottom plan of the cover. Fig. 4 is a vertical cross-section, taken on line 4—4 of Fig. 1, the lid being shown in dotted lines in open position, the invention however being omitted therefrom. Fig. 5 is an enlarged broken plan view of one of the supporting strips. And Fig. 6 is an enlarged vertical cross-section taken on line 6—6 of Fig. 5.

In the drawing, 2 represents the fly box comprising a bottom 2', rear and front sides 2a—2b, and similar ends 2c. 3 represents a cover or lid, one of whose longitudinal edges is shown secured to the top edge of the rear side 2a by hinges 3'; the lid being held in closed position by locking means that may comprise a hinged hasp 4 carried by the cover 3, and a stud 4' mounted on the front side 2b.

5 represents any suitable fish-bait of the fly type, which includes a hook 6, the free end of whose shank is formed with the usual loop or eye 6', to which a line may be secured. The supports for the flies in the present case comprise similar elongated spring sheet metal strips 7, preferably brass or aluminum which are not liable to rust or corrode. These strips are preferably L-shaped in cross-section, as shown in Figs. 3, 4 and 6; the free edges of corresponding portions of the strips being initially formed with laterally extending integral arms 7' (see A, Fig. 5) whose lateral edges are preferably rolled inwardly, as at 7a, towards the longitudinal centers of said arms to form troughs or grooves 7b that are substantially Y-shaped, into whose expanded V-shaped mouths 7c the hooks 6 may be inserted and then pulled downwardly until the meeting edges 7d of the folds 7a are spread sufficiently to grip and resiliently hold the curved portions of the hooks that lie between the shanks and the points of the hooks, as may be understood by consulting Figs. 2, 3, 4 and 6. In practtice, the arms 7' of the L-bars 7 are preferably staggered, as shown in Figs. 2 and 3, in order that the flies may be held free and clear of each other to obviate crushing or otherwise distorting the more or less fragile wings and other delicate portions of the flies. The strips 7 are preferably fastened to the bottom face of the cover 3 by screws 3a, and said strips are also preferably so disposed on the cover 3 that when the cover is closed, as shown in Figs. 1 and 4, the flies are suspended clear and free of the bottom, sides and ends of box 2.

The arms 7' are preferably disposed at such an angle relatively to the plane of the cover 3 as to facilitate the quick, firm and orderly mounting, or the dismounting of the individual flies, without interference with their neighbors.

By constructing the strips 7 of relatively thin-gauge spring metal, the resilient meeting jaws or edges 7d exert sufficient tension to firmly hold the hooks 6 from accidental release and escape, while the boxes are being carried from place to place.

Having thus described my invention, what I claim, is—

1. A fly box having a lid and a series of fly holders carried by the lid, said holders being each formed of resilient material and having a closed bottom and oppositely disposed side arms, said arms being spaced at one end to provide a substantially V-shaped mouth and having their opposite ends turned inwardly and the free edges of said opposite ends abutting each other, said closed bottom providing a guide to engage the free end of the hook of the fly so as to cause the hook to spread the free edges of the said opposite ends of the arms upon movement of the hook longitudinally of the holder and toward said opposite ends of the arms whereby to effect gripping engagement of the said opposite ends with the hook.

2. A fly box in accordance with claim 1 wherein said holders have supports of substantially L- shape in cross-section, one arm of each support being secured to the inner face of the lid and the other arm of each support extending outwardly of the cover at substantially right-angles thereto and connected to the end of the back of the holder and adjacent to the mouth of the holder.

3. A fly box in accordance with claim 1 wherein the lid is hinged and the V-shaped mouths of the holders face the hinged side of the lid whereby to dispose said mouths upwardly upon opening of the lid.

HARRY W. PHILLIPS.